A. B. BENNETT.
BALING PRESS.
APPLICATION FILED MAR. 6, 1907.
899,502.
Patented Sept. 29, 1908.
4 SHEETS—SHEET 1.
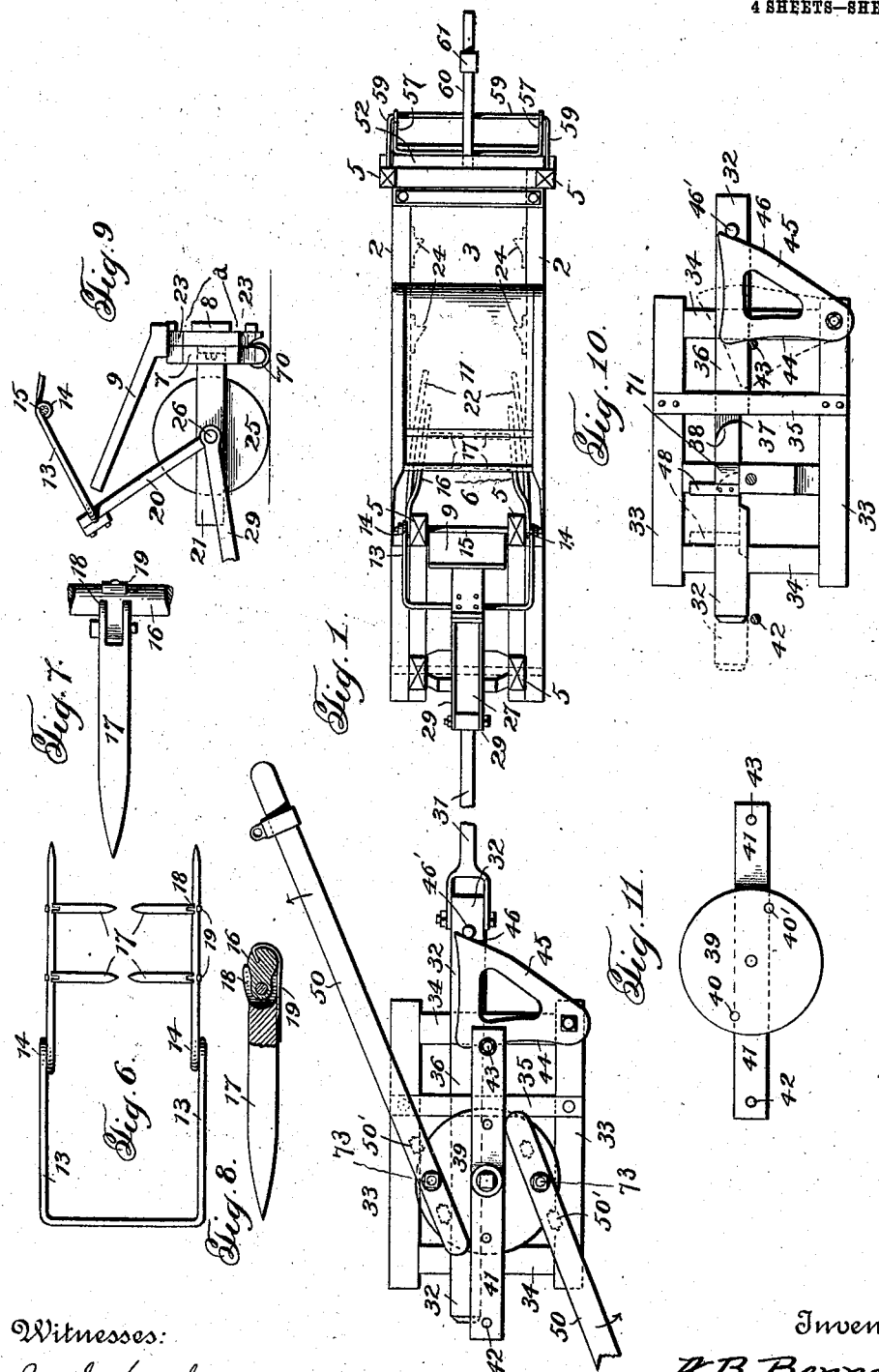

A. B. BENNETT.
BALING PRESS.
APPLICATION FILED MAR. 6, 1907.
899,502.
Patented Sept. 29, 1908.
4 SHEETS—SHEET 2.
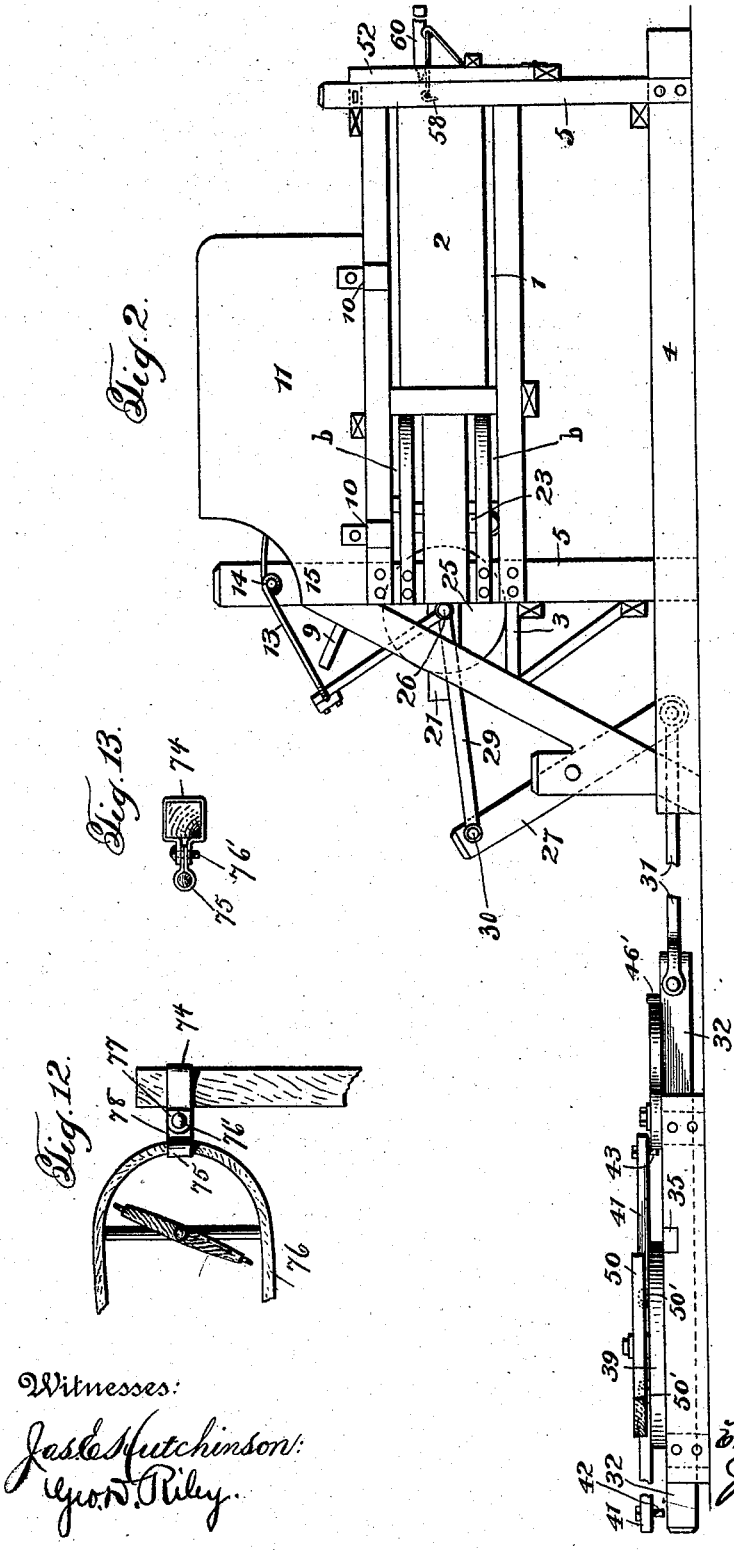

A. B. BENNETT.
BALING PRESS.
APPLICATION FILED MAR. 6, 1907.
899,502.
Patented Sept. 29, 1908.
4 SHEETS—SHEET 3.
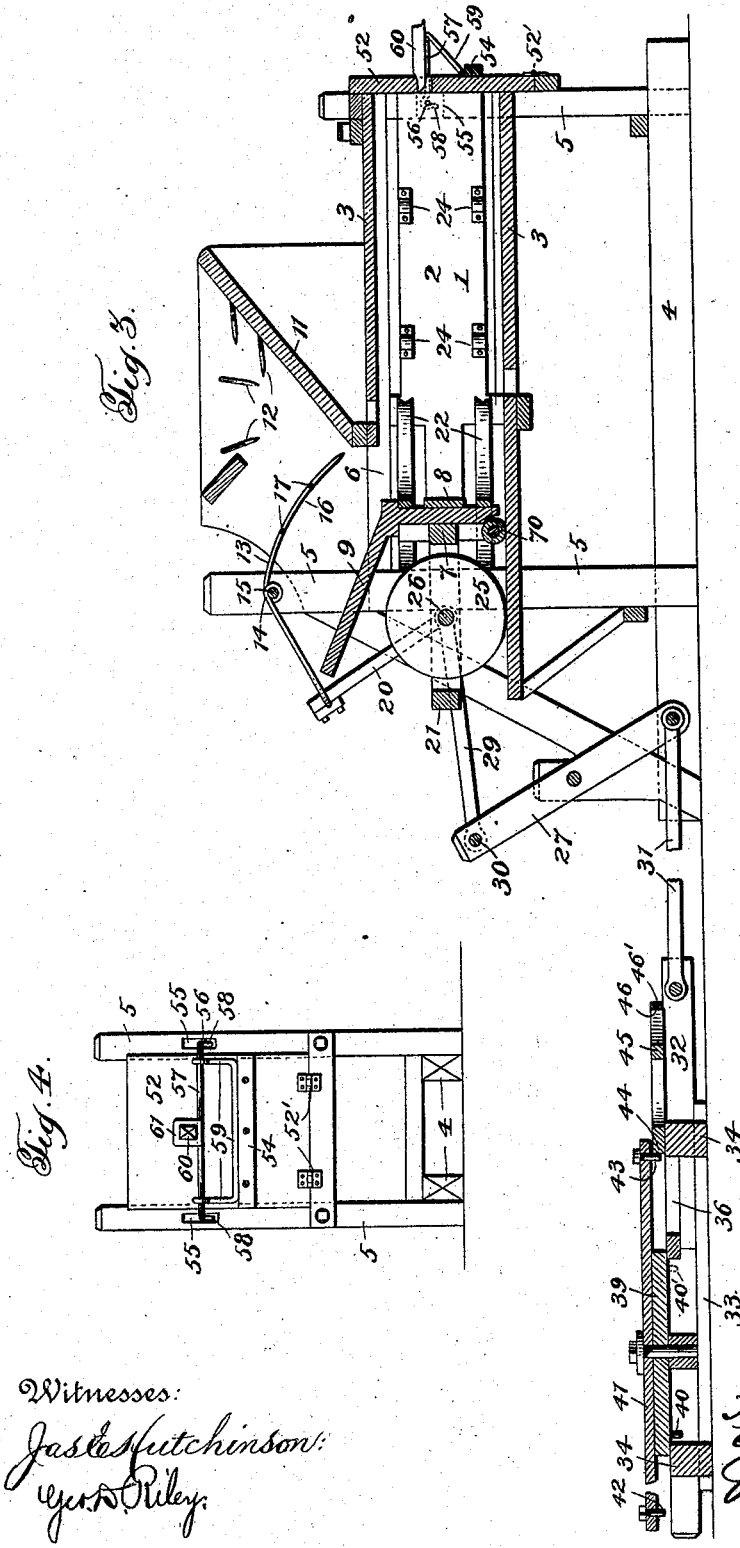

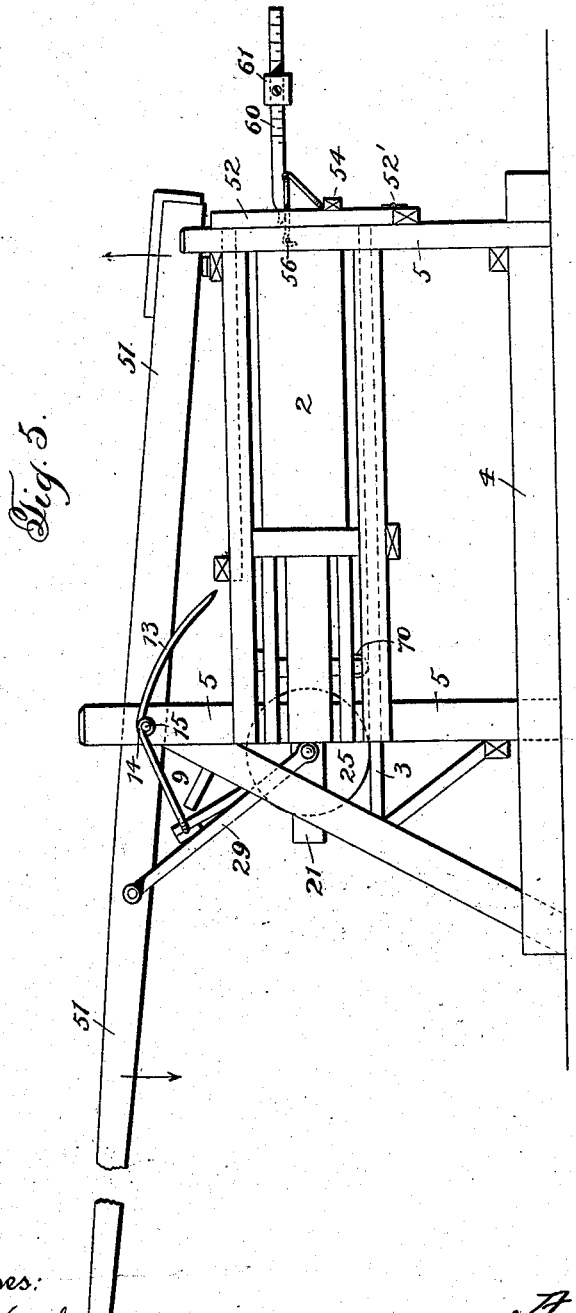

UNITED STATES PATENT OFFICE.

ABIJAH BENJAMIN BENNETT, OF OPELIKA, ALABAMA.

BALING-PRESS.

No. 899,502.  Specification of Letters Patent.  Patented Sept. 29, 1908.

Application filed March 6, 1907. Serial No. 360,996.

*To all whom it may concern:*

Be it known that I, ABIJAH BENJAMIN BENNETT, a citizen of the United States, residing at Opelika, in the State of Alabama, have invented certain new and useful Improvements in Baling-Presses, of which the following is a specification.

The invention relates to baling presses for hay or similar material.

One object of the invention is to provide an improved machine of the character named having simple and efficient mechanism for operating the press plunger by motive power, said plunger operating mechanism being of such a nature and the other parts of the machine being so arranged that with but few changes the press may be readily adapted for manual operation.

Another object of the invention is to provide improved mechanism for feeding and packing the hay or other material into the baling chamber.

A further object of the invention is the provision of novel means for regulating the degree or amount of compression of the material so that bales of substantially uniform hardness or density may be formed.

Other objects and advantages will appear from the annexed detailed description.

An embodiment of the invention comprises the construction and arrangement of parts, hereinafter described, illustrated in the accompanying drawings, and particularly pointed out in the claims hereto appended.

In the drawings: Figure 1 is a top plan view of the machine when arranged to be driven by motor power. Fig. 2 is a side elevation. Fig. 3 is a vertical longitudinal section. Fig. 4 is an end view, illustrating the means for holding the door of the baling chamber in a closed position. Fig. 5 is a side elevation of the machine, when arranged for manual operation. Figs. 6, 7 and 8 are detail views of the feed rake. Fig. 9 is a detail showing the plunger and portions of the operating connections in side elevation. Fig. 10 is a plan view of a part of an operating mechanism. Fig. 11 is an inverted plan of the rotary driven member of the operating mechanism. Fig. 12 is a detail view of the means for applying horse power to the actuating levers for the rotary driven member. Fig. 13 is a detail view, showing in side elevation the coupling means shown in Fig. 12.

Referring in detail to the drawings, wherein like reference characters designate corresponding parts throughout the several views, 1 designates the compression or baling chamber of the press comprising side frames 2, and top and bottom plates 3 securely tied together and supported in a horizontal position from a base 4 by standards 5. The baling chamber is provided with a feed opening 6, and arranged to reciprocate in the baling chamber beneath the feed-opening, is a plunger 7, to the front face of which is secured a washer plate 8, and which is also provided with a deflector board 9 secured to the upper edge thereof. Detachably secured to the baling chamber above the feed-opening 6 by clamps 10, is a hopper 11, the inner walls of which are provided with downwardly and inwardly inclined fingers 12 to prevent the material from being forced upwardly from the hopper.

The material is packed into and fed to the baling chamber from the hopper by an oscillatory rake device consisting of a U-shaped frame 13, formed with bearings 14 to engage a rod 15 mounted in the forward pair of standards 5. The front wall of the hopper is partly removed and the forward portions 16 of the arms of the frame 13 extend within the hopper and constitute rake bars. The rake bars, which have a slight downward curve, and are pointed at their ends, are provided with rake teeth 17, extending at right angles to the rake bars and pivotally connected thereto. The rake teeth are free to swing downward, but they are limited in their upward movement to the plane of the rake bars by shouldered portions 18 at their inner ends. The shouldered portions engage the rake bars when the rake teeth are in the plane of the rake bars, and they are normally held in this position by springs 19, which permit the rake teeth to yield in a downward direction. The rear end of frame 13 is bent downward at an angle to the rake bars and is connected by a link 20 to a short rod 21, carrying the plunger so that, when the plunger is reciprocated, the frame 13 is oscillated, the rake bars moving upward in the hopper on each forward movement of the plunger and moving downwardly on each return stroke of the plunger to feed the material from the hopper to the baling chamber in advance of the plunger. It will be understood that upon the downward movement of the rake bars, the rake teeth are held rigid and act to feed the hay, but that upon the upward movement, they yield downwardly to permit the ready passage of the rake through the hay.

For the purpose of retaining the hay in the baling chamber in its compressed condition after each forward stroke of the plunger, I provide rigid fingers 22, secured to the forward pair of standards, and projecting within the baling chamber from opposite sides thereof, the plunger being provided with slots 23, so that the fingers 22 do not interfere with the operation of the plunger. For the same reason I also provide the side walls of the baling chamber with inclined lugs 24.

Mounted in the plunger rod 21 is a roller 25, which rides on a forward extension of the bottom plate of the baling chamber, and serves to support the plunger clear of the bottom plate, thereby insuring the free and easy movement of the plunger. The axle 26 of the roller 25 projects a short distance from opposite sides of the plunger rod 21, and the lower end of link 20 makes its connection with the plunger rod through the axle 26, whereby any back pressure due to the feed rake will not force the plunger rod out of alinement.

Referring to the arrangement illustrated in Figs. 1 and 2, the plunger rod is connected to one arm of a lever 27 by links 29, loosely engaging the axle 26, and secured to the lever by a removable pivot pin 30. A pitman 31 connects the lever and a reciprocatory shaft 32, the movement of which is transmitted to the plunger rod. The shaft 32 slides in a frame 33, which is held fixed from movement relative to the base 4 in any suitable manner and comprises guide members 34 and a guide bar 35 for the shaft 32, said shaft being provided with a recessed portion 36 arranged to slide beneath the guide bar 35. Mounted for rotation on a vertical stud secured to the frame 33 is a disk 39, provided with two tappets or pins 40—40′ which project downwardly from the under face of the disk and are diametrically oppositely disposed. A bar 41, which is laid on top of the disk 39 and securely bolted thereto, carries at its outer ends, which extend beyond the edge of the disk, pins or tappets 42 and 43 adapted, when the disk is rotated to successively engage a cam edge 44 of a member 45, pivotally secured to the frame 33. The member 45 is also provided with a cam edge 46 for engagement with a pin 46′, secured to the shaft 32, so that when the member 45 is engaged and swung forward by the pins 42 and 43, the shaft is moved forward. The shaft is reciprocated in the reverse direction by the pins or tappets 40, 40′ successively engaging a lateral projection 48 of the shaft supplied for this purpose, the shaft being recessed at 71 adjacent the projection 48 and the recessed portion 36 of the shaft being provided with a curved end wall 38 to permit the ready travel of the tappets 40, 40′ transversely of the shaft. The opposite end wall of the recessed portion 36 is straight and arranged parallel with the guide bar 35, with which it is adapted to contact, acting in unison with the projection 48, which is adapted to engage one of the guide members 34, to limit the rearward movement of the shaft 32.

50 designates actuating levers for the disk 39 pivotally secured thereto intermediate their ends and adapted to have horse power applied to their outer ends to exert a pull or push on the levers as hereinafter more fully set forth. The pivots 73 for the actuating levers are arranged near the periphery of the disk at opposite sides of the bar 41, the sides of which are adapted to afford contact surfaces, raised above the top of the disk, for the inner ends and intermediate portions of the actuating levers, in transmitting motion to the disk. By this arrangement the actuating levers, which are provided with anti-friction devices 50′ to engage the upper surface of the disk, may be positioned as illustrated in Fig. 1 of the drawings with the inner ends of the levers engaging the bar 41 or so that portions of the levers intermediate their ends engage the bar 41 at the ends thereof at points further removed from the center of rotation of the disk. By this change, which may be quickly and easily effected by removing the levers and reversing the position thereof or by swinging the levers around on their pivots, the manner of applying the horse power as well as the degree of leverage can be varied.

As illustrated in Fig. 5, the machine may be readily adapted for manual operation by removing the hopper, and mounting a hand lever 51, between the forward pair of standards 5, and changing the forward connection of the links 29 from the angle lever 27, to the hand lever. Secured to the baling chamber is a spring to serve as a cushion for the rear end of the hand lever, which is weighted to normally maintain the front end of the lever in an elevated position. The baling chamber is provided with a door 52 to close the rear end thereof, and I provide means whereby the door will be held in a closed position until the amount of compression reaches a certain predetermined point. The door 52 is hinged at 52′ to swing downwardly, and is provided with a transverse cleat 54. The rear pair of standards 5 are formed with mortises 55, in which are arranged pins 56. 57 is a U-shaped member, which is provided with hook-shaped portions 58, and to which is pivoted a bail member 59. The door being in a closed position, the hook shaped portions 58 are inserted in the mortises, and engaged with the pins 56, and the locking bail adjusted to bear against the door above the cleat. The door 52 is provided with a recess, in which is inserted the reduced end of a graduated scale lever 60, on which is arranged to slide a weight 61. The scale lever is adapted to rest upon the cross bar of the member 57 and tends to hold the door in its closed position. When the compression reaches a certain degree predetermined by the adjustment of the weight 61 along the scale lever, the door is forced partially open and the rear end of the lever elevated, which acts as a signal to the attendant to remove the bale from the baling chamber. As will be obvious this arrangement provides for regulating the degree of compression, so that bales of substantially uniform hardness and density may be formed, and the character of the bales in this respect may be varied. The plunger 7, besides being supported by the anti-friction roller of the plunger rod, is further provided with anti-friction rollers 70, operating on the bottom board of the baling chamber. The plunger is provided with transverse grooves a and the side walls of the baling chamber are open at b to permit of the passage of the wire carrying needle and wire in wiring the bales.

As will be apparent it is important to the effective operation of the operating mechanism hereinbefore described, that, in applying power to the actuating levers for the disk 39, the levers will not be forced upwardly and the disk twisted or canted out of its normal horizontal position. In order to provide against such a contingency I employ means as illustrated in Figs. 12 and 13 of the drawings for coupling the thills or trees, to which the horses are harnessed to the levers whereby the thills or trees can have lateral and vertical play relative to the ends of the levers and which will tend to prevent the lifting of the levers. With special reference to Figs. 12 and 13 of the drawings, the coupling means comprises a clip 74 to embrace an actuating lever and a band 75 to surround and loosely engage the rear curved portion of the thills 76. The clip 74 and the band 75 are adapted to be pivotally connected by a pin or bolt 76' passing through apertures in extensions 77 and 78 of the clip and band respectively, the extension 77 of the clip being spaced to receive therebetween the extensions 78 of the band.

What I claim is:

1. In a device of the class described, a baling chamber, a reciprocating plunger and plunger operating mechanism, including a reciprocable shaft mounted to move only in the direction of its length, a cam member to engage the shaft, and a rotary driven member provided with tappets to actuate the cam member to move the shaft in one direction, and with tappets to engage and return the shaft.

2. In a device of the class described, a baling chamber, a reciprocating plunger and plunger operating mechanism including a reciprocable shaft mounted to move only in the direction of its length, a cam member to engage the shaft, and a rotary driven member provided with tappets to actuate the cam member to move the shaft in one direction and with tappets to engage and return the shaft, said tappets being so arranged with relation to each other that the shaft is given a continuous reciprocatory movement.

3. In a device of the class described, a baling chamber, a plunger having a continuous reciprocatory movement, and plunger operating mechanism including a reciprocable shaft, provided with a tappet arm and a tappet pin, a swinging cam member having two cam surfaces, one of said surfaces being to engage the tappet pin, and a rotary driven member provided with tappets to engage one cam surface of the swinging cam member to actuate the cam member to move the shaft in one direction, and with tappets to engage the tappet arm and return the shaft.

4. In a device of the class described, a baling chamber, a reciprocating plunger and plunger operating mechanism, including a reciprocable shaft, a cam member to slidably engage the shaft, and a rotary driven member provided with tappets to actuate the cam member to move the shaft in one direction and with tappets to engage and return the shaft, said cam member being mounted independently of the rotary driven member.

5. In a device of the class described, a baling chamber, a reciprocating plunger, a plunger rod, an anti-friction roller journaled in the plunger to support the same and plunger operating mechanism including a reciprocable bar, a rotary driven member to actuate said bar, a lever pivoted intermediate its ends, a pitman connecting the lever and the bar, and a link connection between the lever and the journal of the anti-friction roller.

6. In a device of the class described, a baling chamber, a reciprocating plunger, a plunger rod, an anti-friction roller journaled in the plunger rod to support the same and plunger operating mechanism including a reciprocable bar, a rotary driven member to actuate said bar, a lever pivoted intermediate its ends, a pitman connecting the lever and the bar, and links loosely connected with the journal of the anti-friction roller and having a detachable pivotal connection with the lever.

7. In a device of the class described, a baling chamber, provided with a feed opening, a reciprocating plunger, a plunger rod, a roller journaled in the plunger rod, plunger operating mechanism and an oscillatory feed rake having a link connection with the journal of the roller.

8. In a device of the class described, a baling chamber provided with a feed opening, a reciprocating plunger and a feed rake comprising longitudinal rake bars provided with laterally extending rake teeth.

9. In a device of the class described, a baling chamber provided with a feed opening, a reciprocating plunger and a feed rake comprising rake bars provided with laterally extending rake teeth pivoted thereto.

10. In a device of the class described, a baling chamber provided with a feed opening, a reciprocating plunger and an oscillatory feed rake comprising rake bars provided with rake teeth yieldable in one direction.

11. In a device of the class described, a baling chamber, provided with a feed opening, a reciprocating plunger and a feed rake comprising longitudinal rake bars and rake teeth pivoted thereto, and provided with shouldered portions to limit their movement in one direction to the plane of the rake bars and springs to normally hold the rake teeth in the plane of the rake bars.

12. In a device of the class described, a baling chamber, a reciprocating plunger and plunger operating mechanism, including a reciprocable shaft, a cam member to slidably engage the shaft, and a rotary driven member provided with tappets to actuate the cam member to move the shaft in one direction and with tappets to engage and return the shaft, said tappets being so arranged with relation to each other that the shaft is given a continuous reciprocatory movement, said cam member being mounted independently of the rotary driven member.

13. In a device of the class described, a baling chamber, a reciprocating plunger and plunger operating mechanism including a disk journaled at its center for rotation and actuating levers for the disk, said disk being provided with a contact member extending thereacross, and said levers being pivoted to the disk at opposite sides of the contact member so that when swung in either direction they will engage the contact member of the disk to rotate the disk.

14. In a device of the class described, a baling chamber, a reciprocating plunger and plunger operating mechanism including a disk journaled for rotation and actuating levers for the disk, said disk being provided with contact portions to be engaged by said levers in rotating the disk, and said levers being pivoted to the disk intermediate their ends so that portions of the levers at opposite sides of their fulcrums are adapted to engage a contact portion of the disk to rotate the disk in accordance with the direction in which the levers are moved.

15. In a device of the class described, a baling chamber, a reciprocating plunger and plunger operating mechanism including a disk journaled at its center for rotation and actuating levers for the disk, said disk being provided with a contact member to be engaged by the levers to rotate the disk, and said levers being pivoted to the disk intermediate their ends and provided with anti-friction devices at both sides of their fulcrums to engage the upper surface of the disk.

16. In a device of the class described, a baling chamber, a reciprocating plunger and plunger operating mechanism including a reciprocable shaft, a cam member to engage said shaft and a rotary driven member provided with means to actuate the cam member to move the shaft in one direction and with means to return the shaft, said last mentioned means being independent of the first mentioned means.

17. In a device of the class described, a baling chamber, a reciprocating plunger and plunger operating mechanism including a reciprocable shaft, a cam member to engage said shaft and a rotary driven member provided with tappets to actuate the cam member to move the shaft in one direction and with tappets independent of the first mentioned tappets, to return the shaft.

18. In a device of the class described, a baling chamber, a reciprocating plunger and plunger operating mechanism including a reciprocable shaft, a cam member to engage said shaft and a rotary driven member provided with tappets to actuate the cam member to move the shaft in one direction and with tappets independent of the first mentioned tappets, to return the shaft, said tappets being so arranged with relation to each other that the shaft is given a continuous reciprocatory movement.

19. In a device of the class described, a baling chamber, a door to close one end of the baling chamber and means for retaining the door in a closed position until the degree of compression reaches a predetermined point, said means including a frame comprising two members hinged together, said frame being pivotally connected to the baling chamber and adapted to be arranged with one member thereof engaging the door, and a weighted lever to engage the door and the frame.

20. In a device of the class described, a door to close one end of the baling chamber provided with a seat, and means for retaining the door in a closed position until the degree of compression reaches a predetermined point, said means including a frame pivotally connected to the baling chamber, the frame comprising two sections hinged together and adapted to be arranged with one section thereof engaging the door, and a weighted lever to engage the seat of the door and rest upon the frame.

21. In a device of the class described, a baling chamber, a door hinged to the baling chamber to close one end thereof, said door being provided with a shoulder extending transversely thereof and a seat, and means for retaining the door in a closed position including a frame pivotally connected to the baling chamber frame, the frame comprising two sections hinged together and adapted to be arranged with one of the sections engaging the shoulder of the door, a lever provided with a reduced end to engage the seat of the door and rest upon the frame and a weight for the lever.

22. In a device of the class described, a baling chamber, the frame of the baling chamber having mortises and pins extending in the mortises, a door hinged to the baling chamber to close one end thereof, said door having a transverse shoulder and a seat, and means for retaining the door in a closed position until the degree of compression reaches a predetermined point, said means including a frame comprising a substantially U-shape member provided with hooks at its ends to detachably engage the pins in the mortises of the baling chamber frame, a bail hinged to said U-shape member to engage the shoulder of the door, a lever to engage the seat of the door and rest upon the U-shape member, and a weight for the lever.

In testimony whereof I affix my signature, in presence of two witnesses.

ABIJAH BENJAMIN BENNETT.

Witnesses:
   W. F. CHESTER,
   HENRY C. HAWKINS.